(12) United States Patent
Waslowski et al.

(10) Patent No.: US 6,781,705 B2
(45) Date of Patent: Aug. 24, 2004

(54) DISTANCE DETERMINATION

(75) Inventors: Kai Waslowski, Emmendingen (DE); Gerhard Merettig, Sexau (DE); Siegfried Ringwald, Elzach (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 09/997,417

(22) Filed: Nov. 29, 2001

(65) Prior Publication Data

US 2002/0097404 A1 Jul. 25, 2002

(30) Foreign Application Priority Data

Nov. 29, 2000 (DE) .......................................... 100 59 156

(51) Int. Cl.⁷ .............................................. G01B 11/14
(52) U.S. Cl. ...................... 356/614; 356/623; 356/3.14
(58) Field of Search ................................ 356/601–623, 356/3.08, 3.13, 3.04

(56) References Cited

U.S. PATENT DOCUMENTS

| | | | | |
|---|---|---|---|---|
| 4,752,799 A | * | 6/1988 | Stauffer ...................... 396/109 |
| 4,867,570 A | * | 9/1989 | Sorimachi et al. ........... 356/603 |
| 5,182,612 A | * | 1/1993 | Rheme ........................ 356/492 |
| 5,255,064 A | * | 10/1993 | Maekawa ................... 356/3.14 |
| 5,264,893 A | * | 11/1993 | Nonaka ....................... 396/104 |
| 5,355,083 A | * | 10/1994 | George et al. ............... 324/229 |
| 5,512,997 A | * | 4/1996 | Ogawa ....................... 356/3.04 |
| 5,613,167 A | * | 3/1997 | Suzuki ........................ 396/106 |
| 5,754,281 A | * | 5/1998 | Maeda ....................... 356/3.08 |
| 6,002,357 A | | 12/1999 | Redfern et al. |
| 6,046,447 A | | 4/2000 | Skell et al. |
| 6,271,918 B2 | * | 8/2001 | Blais ........................... 356/613 |

FOREIGN PATENT DOCUMENTS

| | | |
|---|---|---|
| DE | 4004530 A1 | 8/1991 |
| DE | 4129702 C2 | 10/1992 |
| DE | 4140614 C2 | 6/1993 |
| DE | 19619308 A1 | 11/1997 |
| DE | 19721105 A1 | 11/1998 |
| EP | 0277542 B1 | 3/1991 |
| EP | 0540343 B1 | 2/1996 |
| GB | 2239760 A | 7/1991 |
| GB | 2239999 A | 7/1991 |
| GB | 2274369 A | 7/1994 |

* cited by examiner

Primary Examiner—Hoa Q. Pham
(74) Attorney, Agent, or Firm—Townsend and Townsend and Crew LLP (57) ABSTRACT

The invention relates to a method for the determination of the object distance between an opto-electronic sensor working according to the principle of triangulation and an object, wherein the sensor has at least one measuring channel between a transmission unit for the emission of electromagnetic sensing rays into the measuring region and a reception unit for the detection of sensing rays reflected and/or remitted from the measuring region;

wherein the sensor has at least one additional channel which has a further transmission unit and/or a further reception unit in addition to the transmission unit and the reception unit; and wherein the received signals of the measuring channel and of the additional channel are jointly evaluated for the determination of the object distance.

The invention further relates to an apparatus for the carrying out of this method.

23 Claims, 4 Drawing Sheets

DISTANCE DETERMINATION

BACKGROUND OF THE INVENTION

The invention relates to a method and to an apparatus for determining the object distance between an opto-electronic sensor working according to the principle of triangulation and a sensed object.

With known sensors which work according to the principle of triangulation, an emitted light spot is imaged on the object whose distance is to be determined and from the object onto a spatially resolving receiver. The position of the reflected and/or remitted light spot on the receiver is dependent on the distance between the sensor and the object, also known as the operating distance. The position of the center of the light spot on the receiver can thus be used as a measure for the distance to be determined. It is known for this purpose to divide the light-sensitive range of the receiver into two sub-ranges, namely a near range and a far range. The distribution of the intensity of the imaged light spot between the near range and the far range is dependent on the object distance so that the difference between the output signals of the two ranges forms the measure for the object distance.

The disadvantage with these sensors is that interference signals superimposed on the actual received signal which comes from the light spot reflected and/or remitted by the object cannot be recognized as such. Sources of such interference signals are, for example, defects in or contaminations of the sensor optical system, reflecting or shiny areas or areas of high contrast either on the object whose distance is to be determined or on interfering objects arranged to the side or the rear of the object to be sensed and which are also known as background objects.

SUMMARY OF THE INVENTION

It is an object of the invention to determine the distance between the sensor and an object in the simplest and most reliable manner possible using an opto-electronic sensor working according to the principle of triangulation independently of any error sources which may be present and which adulterate the actual received signal.

This object is satisfied, on the one hand, in that the sensor has at least one measuring channel between a transmission unit for the transmitting of electromagnetic sensing rays into the measuring region and a reception unit for the detection of sensing rays reflected and/or remitted from the measuring region, in that the sensor has at least one additional channel having a further transmission unit and/or a further reception unit in addition to the transmission unit and the reception unit of the measuring channel, and in that the received signals of the measuring channel and of the additional channel are jointly evaluated in order to determine the object distance.

In accordance with the invention, additional information is made available by the additional channel and can be used, by the joint evaluation of the information from the measuring channel, in order to identify error sources as such and so to reduce the influence of the error sources on the distance measurement.

The joint evaluation takes place in an evaluation unit which is associated with the sensor and to which the reception unit or reception units are connected. Suitable mathematical evaluation methods, for example cross-correlations between a stored or learned intensity distribution of the received signals and a current intensity distribution, can be used respectively in dependence on the design of the method for the distance measurement or on the design and the mode of operation of the sensor.

It is preferred for the measuring channel and the additional channel to be operated jointly and in particular at least substantially simultaneously for each object distance.

This also includes the case where the channels are successively controlled in fast succession by, for example, a plurality of transmission units successively emitting their sensing rays in short time intervals and/or a plurality of reception units being successively read out in order to determine the respective object distance by a joint evaluation of the received signals.

In accordance with an embodiment of the invention, provision can be made that only the received signal of the measuring channel is used for the determination of a distance value, that a determination is made by means of the received signal of the additional channel whether the received signals meet at least one criterion and that, if the additional criterion is met, the distance value is used as a measure for the object distance.

Only the received signal of the measuring channel is thus used for the actual distance measurement after a check has been made with the aid of the received signal of the additional channel whether the measurement satisfies certain demands and the received signals meet certain additional conditions. A decision can thus be made by means of the additional channel whether the received signal of the measuring channel has been adulterated or not.

In accordance with an alternative embodiment of the invention, it can be provided that the received signals of both the measuring channel and the additional channel are used to determine a distance value serving as a measurement for the object distance.

In this respect, the distance value is not only determined with the aid of one of the received signals, but the received signals of both the measuring channel and the additional channel are used for the determination of the object distance.

It is preferred that the respective intensity distribution of the received signal on the reception unit or on the reception units be used for the distance determination in the measuring channel and/or in the additional channel.

In accordance with another aspect of the invention, spatially resolving detectors of generally any desired kind can be provided as reception units. The position of a light spot or bead reflected and/or remitted from the object and information on the circumstances of the light spot reflection and/or remittance can be read off from the detected intensity distributions.

In a preferred embodiment of the invention, a separate transmission unit and preferably a common, reception unit are respectively used for the measuring channel and the additional channel.

In this variant of the invention, work is carried out with at least two reception units which are operated such that the emitted sensing rays are incident at different positions on the object so that a corresponding positional difference is detected on the reception unit.

In this respect, the two transmission units can emit the sensing rays in different directions for the formation of the measuring channel and of the additional channel. Then mutually corresponding characteristic ranges of the reception signals of the measuring channel and of the additional channel are each examined, preferably in the joint evaluation, as to whether they are in particular mutually displaced by an expected amount.

Provision is alternatively made, in accordance with a further embodiment of the invention, when a plurality of transmission units are used, that the sensing rays of the measuring channel and of the additional channel are focused at different distances, with preferably a near range being focused at in one channel and a far range being focused at in the other channel.

Then mutually corresponding characteristic ranges of the received signals of the measuring channel and of the additional channel are preferably respectively examined in the joint evaluation as to whether the emitted sensing rays are imaged in particular with different sharpness, in particular different sharpness in accordance with an expected amount.

In a further alternative in accordance with a further embodiment of the invention using a plurality of transmission units, it is provided that the sensing rays of the additional channel are deliberately emitted, in particular in an unfocused, scattered, expanded and/or diffuse manner, such that a spatially expanded sensing zone is emitted into the measuring region. In this respect, the sensing zone can preferably cover a substantial part of the half-space of the sensor on the sensed object side or at least substantially the whole half-space.

Then, in the joint evaluation, a difference is preferably formed between the received signals of the measuring channel and of the additional channel. In this respect, first the received signal of the additional channel is preferably deducted from the received signal of the measuring channel, negative difference values are subsequently set to zero and a resulting positive difference signal is then used for the determination of the distance.

The scattered light resulting in interference signals can be imaged by the spatially expanded sensing zone so that critical viewing regions of the sensor can be monitored for the presence of interfering objects or artifacts.

In accordance with the invention, not only a plurality of transmission units can be provided, but alternatively a division into a plurality of reception units and/or optical reception systems can also be made on the reception side, with a joint transmission unit preferably being used for the measuring channel and the additional channel.

In accordance with a preferred variant of the invention, the transmission unit is in this respect arranged between the at least two reception units and/or optical reception systems, a center and the distance of the center from the position of the transmission unit are respectively determined for the received signals and the mean value of the center distances is used as the measure for the object distance.

In accordance with an alternative variant of the invention, the at least two reception units and/or optical reception systems are arranged at the same side of the transmission unit and the distance between mutually corresponding ranges of the received signals of the measuring channel and of the additional channel are used as the measure for the object distance.

While a plurality of transmission units can be used when reflecting or shiny interfering objects are to be expected next to or behind the object to be sensed, a plurality of reception units and/or optical reception systems are used when errors can be expected as a result of a relatively high-contrast sensed object.

All variants of the invention, the introduction to the description and the following description of the Figures can also be combined with one another—provided that they do not contradict one another—whereby a particularly secure and reliable determination of the object distance is possible.

The underlying object of the invention is satisfied, on the other hand, by an apparatus for the determination of the object distance between an optoelectronic sensor working according to the principle of triangulation and a sensed object having at least one measuring channel between a transmission unit for the transmission of electromagnetic sensing rays into the measuring region and a reception unit for the detection of sensing rays reflected and/or remitted from the measuring region, having at least one additional channel which has a further transmission unit and/or a further reception unit in addition to the transmission unit and the reception unit of the measuring channel and having an evaluation unit for the joint evaluation of the received signals of the measuring channel and of the additional channel for the determination of the object distance.

All transmission units and reception units are preferably arranged in a common sensor plane which preferably extends perpendicular to the distance direction which corresponds to the shortest distance between the sensor and the object and which is also termed the transmission and/or reception axis.

The or each transmission unit is preferably provided in the form of an LED or of a laser device, for example a laser diode. Furthermore, the or each reception unit is preferably provided in the form of a spatially resolving detector, for example in the form of a single-row or multi-row photodiode array, of a CCD (charge coupled device) or of a PSD (position sensitive device).

Further embodiments of the invention are also set forth in the description and the drawing.

The invention will be described in the following by way of example with reference to the drawing.

BRIEF DESCRIPTION OF THE DRAWINGS

FIGS. 1–4 show different embodiments of the invention which employ a sensor arrangement (FIGS. 1a, 2a, 3a, 4a) and intensity distributions on the reception side (FIGS. 1b, 2b, 3b, 4b).

DESCRIPTION OF THE PREFERRED EMBODIMENTS

Figure 1A:
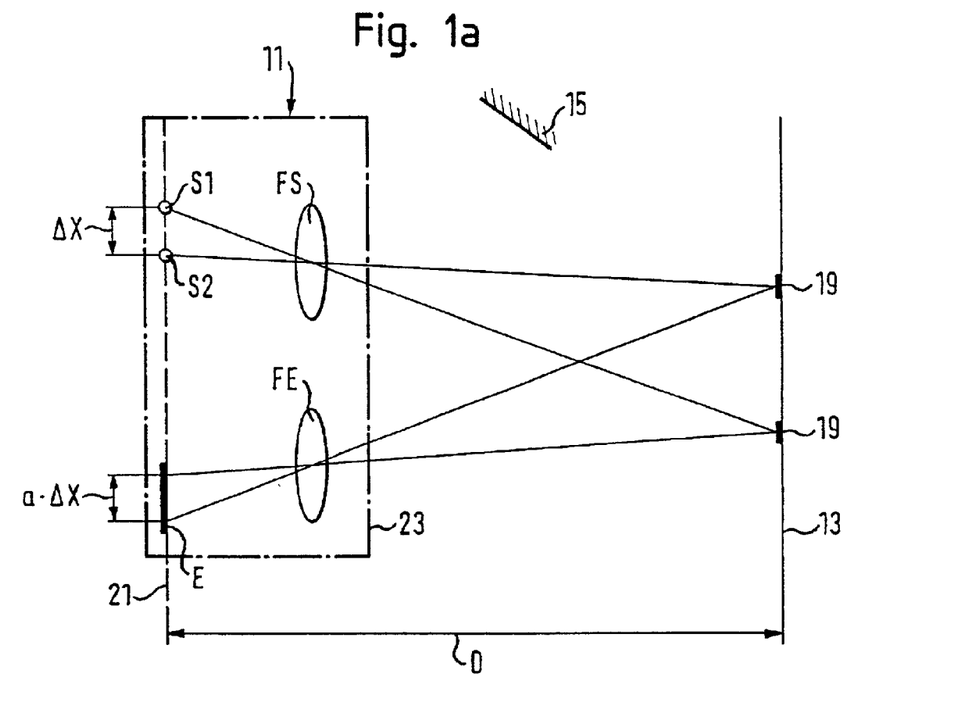
Figure 1B:
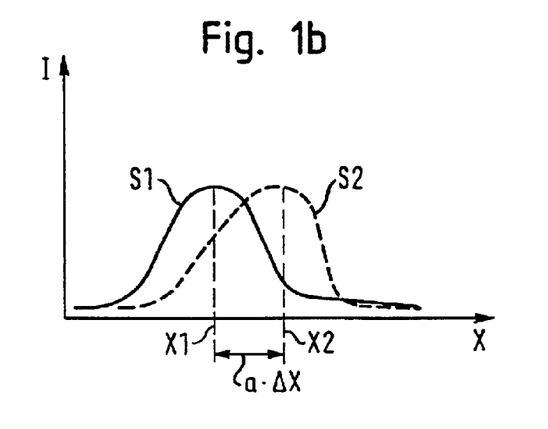

In the embodiment of the invention in accordance with FIGS. 1a and 1b, the sensor 11 comprises two spatially separate transmission units S1 and S2 spaced in a sensor plane 21 by $\Delta X$ and, for example, each in the form of an LED or a laser diode. A common optical transmission system FS is associated with the transmission units S1 and S2, for example in the form of a lens for the focusing of the sensing rays.

Furthermore, the sensor 11 has a joint reception unit E for the two transmission units S1, S2, for example in the form of a single-row or multi-row photodiode array, which is likewise arranged in the sensor plane 21. The reception unit E is associated with an optical reception system FE formed, for example, as a lens. Alternatively, the reception unit E could also be arranged outside the sensor plane 21.

The sensor components are arranged in a common sensor housing 23 which is indicated by a chain-dotted line in FIG. 1a.

The sensor 11 serves to determine the distance D, termed the object distance in the following, between the sensor 11 and a sensed object 13 lying in the measuring range region of the sensor 11. The sensor plane 21, for example, as is indicated in FIG. 1a, serves as the reference plane for the determination of the distance.

The sensor 11 operates according to the principle of triangulation. Sensing rays emitted by the transmission units S1, S2 are reflected and/or remitted by the sensed object 13 after passing through the optical transmission system FS and are imaged on the common reception unit E by means of the optical reception system FE. Each transmission unit S1, S2 generates a light spot or a sensing spot 19 on the sensed object 13, with said sensing spot 19 being imaged on the reception unit E and its position on the reception units E being dependent on the object distance D.

If no interference sources are present, then the object distance D can already be determined from the position of a sensing spot on the reception unit E.

The provision in accordance with the invention of two separate, jointly operated channels, that is of a measuring channel S1-E and an additional channel S2-E, allows a secure and reliable measurement of the object distance D even when interference sources are present which reflect and/or remit the radiation emitted by the transmission units S1, S2 to the reception unit E and thus adulterate the actual received signals coming from the sensed object 13. The interfering objects can, for example, be surfaces with a high reflection and/or remittance capability, in particular reflecting surfaces, next to or behind the sensed object 13. Such a reflecting interfering object 15, which is located outside the transmission axis, is represented schematically in FIG. 1a.

The influence of the interfering object 15 and the procedure in accordance with the invention to separate the interference signal from the wanted signals are indicated in FIG. 1b.

FIG. 1b shows the distribution of the intensity I of the radiation of wanted signals reflected and/or remitted overall onto the reception unit E in a direction X. The intensity distribution of the transmission unit S1 is indicated by a solid line, that of the transmission unit S2 by a broken line. Each intensity distribution has two characteristic regions, namely a represented wanted signal with a center at X1 or X2 which corresponds to the sensing spot 19 reflected and/or remitted by the sensed object 13 and an interference signal which is not represented. The interference signals have a center at the same position on the reception unit E with reference to both transmission units S1 and S2.

Only the positions X1 and X2 form a measure for the correct object distance D. The evaluation of the position of the center of the interference signals would result in an incorrect object distance. If only a single measuring channel were to be present and thus only a single intensity curve were to be available, then there would be a risk—without the additional information—of the sensor 11 assessing the interference signal as a wanted signal and providing an incorrect distance value by the evaluation of the position of the center of the interference signals.

However, by the provision, in accordance with the invention, of an additional channel, which is realized in the present embodiment by provision of an additional transmission unit S2, the interference signal can be identified as such. For this purpose, use is made of the fact that the distance a·ΔX of the two received signals on the reception unit E is proportional to the distance ΔX of the two transmission units S1, S2, in the corresponding direction. The proportionality factor a is dependent on the imaging properties of the optical transmission system FS and the optical reception system FE, that is a=f (FS, FE) applies. This relationship applies to all object distances D, that is the correlation between ΔX, on the one hand, and a·ΔX, on the other hand, is independent of the object distance D.

In the joint evaluation in accordance with the invention of the received signals of the measuring channel S1-E and of the additional channel S2-E, characteristic regions of the intensity curves in the form of peaks, which could correspond to a sensing spot reflected and/or remitted by the sensed object 13, are examined as to whether they are mutually displaced by the expected amount a·ΔX. If this is not the case, then these characteristic ranges are eliminated from the determination of the distance and either an error message is produced or further characteristic regions of the intensity distributions are examined.

If it is found, in contrast, that two peaks of the intensity distributions are mutually displaced by the expected amount of a·ΔX, then at least one of these peaks is used to determine the object distance D, with the position of its center X1 or X2 representing a measure for the object distance D.

Figure 2A:
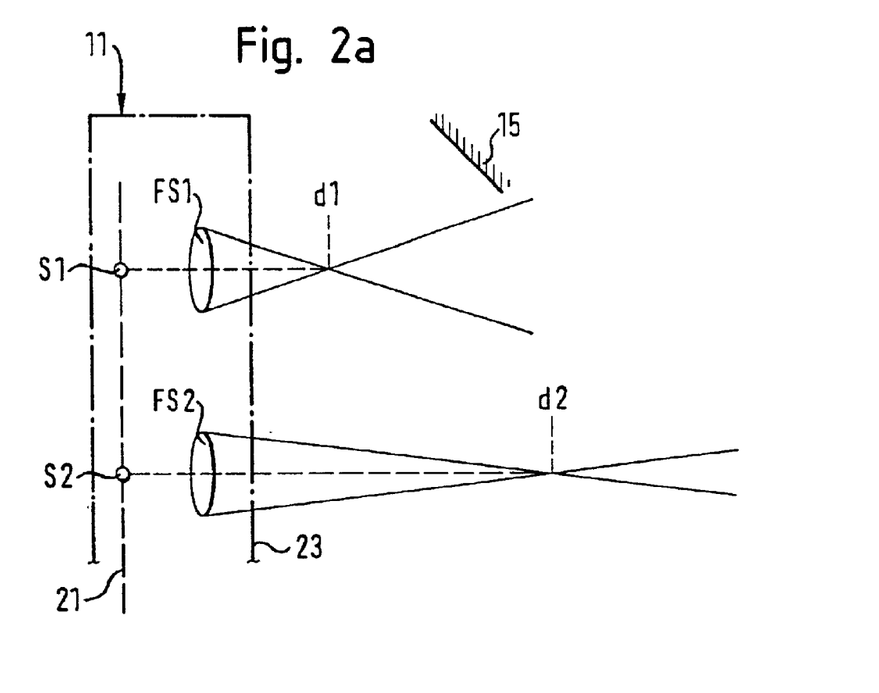
Figure 2B:
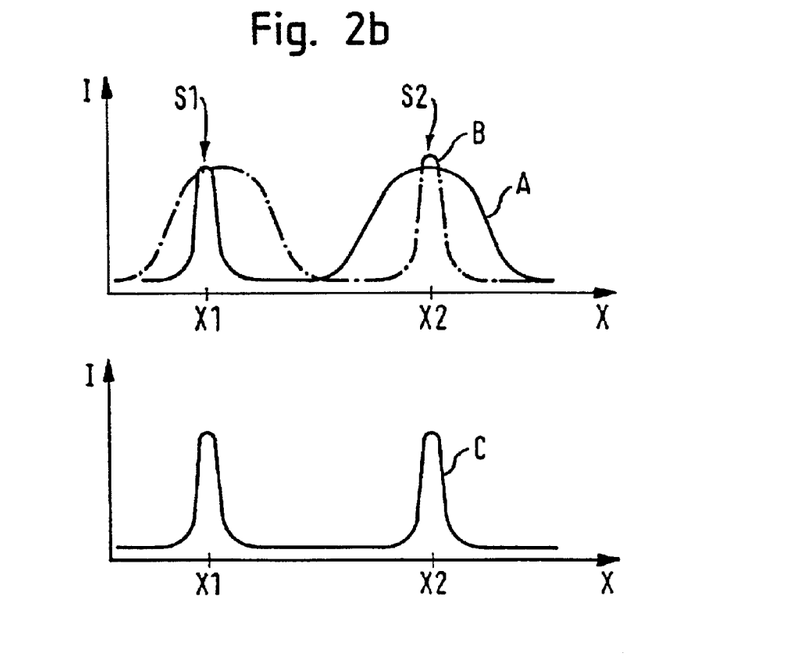

In the embodiment of the invention illustrated in FIGS. 2a and 2b, the sensor 11 is in turn provided with two separate transmission units S1 and S2 with which a common reception unit (not shown) is associated. In this embodiment, each transmission unit S1, S2 is associated with a separate optical transmission system FS1, FS2 in the form, for example, of a lens.

The optical transmission systems FS1 and FS2 differ in that they focus the sensing rays emitted by the transmission units S1 and S2 at different distances d1 and d2 respectively. Depending on the distance to be determined of a sensed object not shown in FIG. 2a from the sensor 11, the sensing spot of the one transmission unit S1 is thus imaged more sharply or less sharply on the reception unit than the sensing spot of the other transmission unit S2.

The expected intensity distribution of the wanted signals basically corresponds to the distributions A, B which are shown schematically in the upper illustration of FIG. 2b. If the sensed object is located relatively close to the sensor 11, then the sensing spot of the one transmission unit is imaged more sharply on the receiver than that of the other transmission unit, with the difference in sharpness being detected by the different widths of the mutually corresponding regions or peaks of the respective intensity distribution A or B. With a sensed object relatively far away from the sensor 11, it is the other way round, that is the other sensing spot is imaged more sharply.

If interfering radiation, for example due to a reflecting interfering object 15 (cf. FIG. 2a), is incident on the reception unit, then the intensity distribution C shown schematically in the lower illustration of FIG. 2b results, for example. The interference signal of the interfering object 15 can therefore have the consequence that it can no longer be assumed, on the basis of a difference in the sharpness of the imaged sensing sports corresponding to an expected amount, that the peaks can be used to determine the correct object distance.

The presence of an interfering object 15 adulterating the measurement can therefore be recognized by the detection of a received signal not showing the expected intensity curve.

Figure 3A:
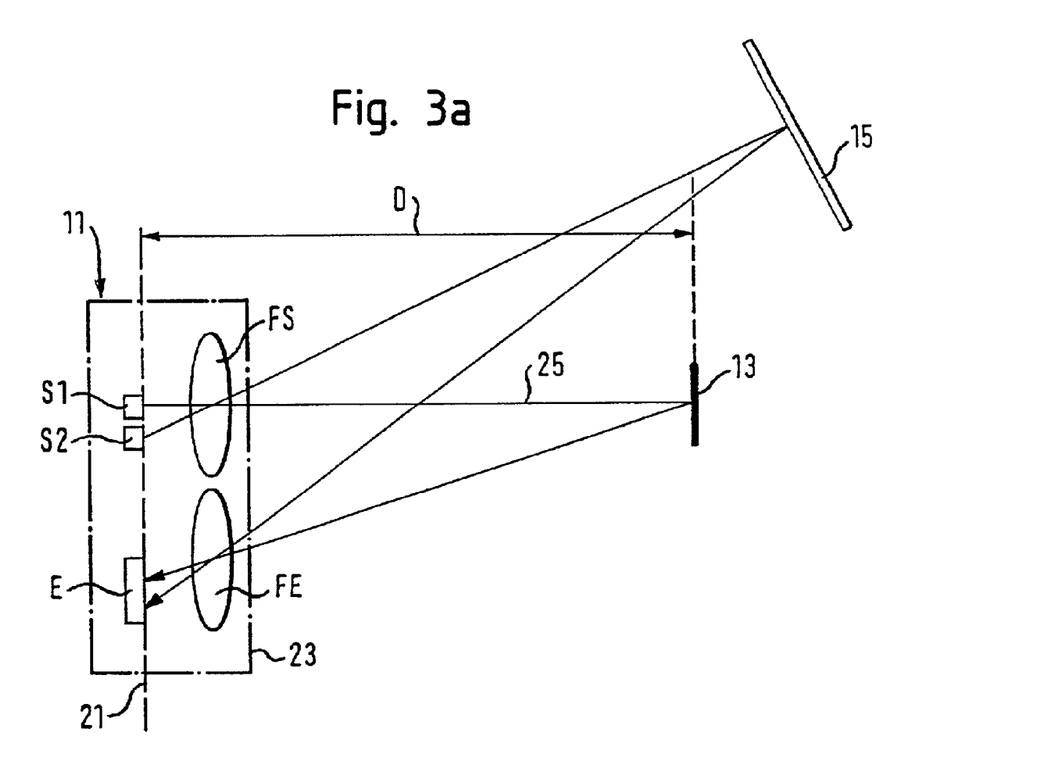
Figure 3B:
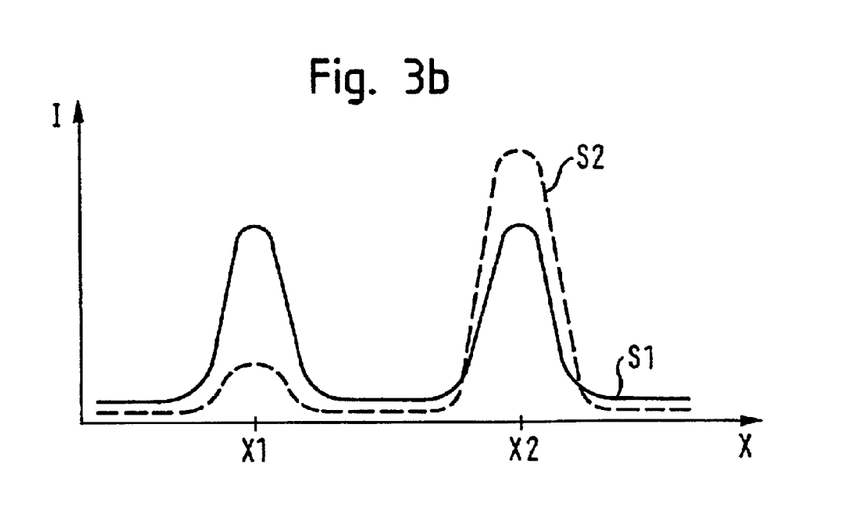

The embodiment of the invention in accordance with FIGS. 3a and 3b shows a further possibility of using an additional channel to eliminate the corrupting influence of an interfering object 15 adulterating the measurement of the object distance D.

The sensor 11 comprises two transmission units S1 and S2 as well as a common reception unit E. A common optical transmission system FS is provided for the two transmission units S1, S2 in the form of a lens, and an optical reception system FE is provided for the reception unit and is also formed as a lens.

Whereas the emitted sensing rays 25 are focused in the measuring channel S1-E formed by the transmission unit S1 and the reception unit E for the generation of a sensing spot on the sensed object 13, it is ensured in the additional channel S2-E that a sensing zone is emitted into the half-space of the sensor 11 on the sensed object side which is spatially substantially further expanded in comparison with the sensing rays 25 of the measuring channel S1-E. The sensing zone can be generated by deliberate non-focusing, scattering, expansion and/or diffuse transmission of the sensing rays of the transmission unit S2.

Interfering radiation which is caused, for example, by scattering in the transmission unit S2, by reflections and/or remittance at optical elements such as diaphragms or tubes and by defects in the optical transmission system FS such as scratches, dust or striae at a transmission lens, and which is reflected and/or remitted onto the reception unit E by an interfering object 15, is deliberately imaged by the sensing zone.

FIG. 3b shows the intensity distributions of the two received signals coming from the two transmission units S1, S2. A case is shown where, due to the above-mentioned error sources, radiation transmitted in the measuring channel S1-E is also incident on the interfering object 15 and is reflected and/or remitted by this onto the reception unit E, whereby an intensity peak is generated at the position X2. The corresponding intensity peak of the transmission unit S2 of the additional channel is higher than that of the measuring channel in which the operation takes place with focused sensing rays 25 as a result of the deliberate imaging of the interfering radiation. At the position X1, however, which corresponds to the object distance D to be determined, a higher received signal occurs in the measuring channel S1-E than in the additional channel S2-E, since the intensity distribution of the sensing zone at the sensed object is lower than that of the sensing rays 25 with which a sensing spot is generated on the sensed object 13.

The joint evaluation of the received signals of the two channels takes place in that the received signal S2 of the additional channel is deducted from the received signal S1 of the measuring channel and negative difference values are set to zero. A positive difference signal then remains at the position X1 on the reception unit E corresponding to the object distance D. This resulting positive difference signal is then used for the determination of the object distance D.

In the embodiment shown, the transmission units S1, S2 and the reception unit E are arranged in the joint sensor plane 21, with the transmission unit S2 of the additional channel, by means of which the spatially expanded sensing zone is produced, being located between the transmission unit S1 of the measuring channel and the reception unit E. The imaging of the rays emitted by the two transmission units S1, S2 takes place by the joint optical transmission system FS. The intensity in the measuring channel and in the additional channel are selected such that the additional channel delivers a higher signal at the position X2 on the reception unit E corresponding to the interfering object 15 than the measuring channel, as is shown in FIG. 3b, so that a positive signal remains only at the position X1 corresponding to the object distance D in the evaluation subsequent to the formation of the difference between the two received signals.

Figure 4A:
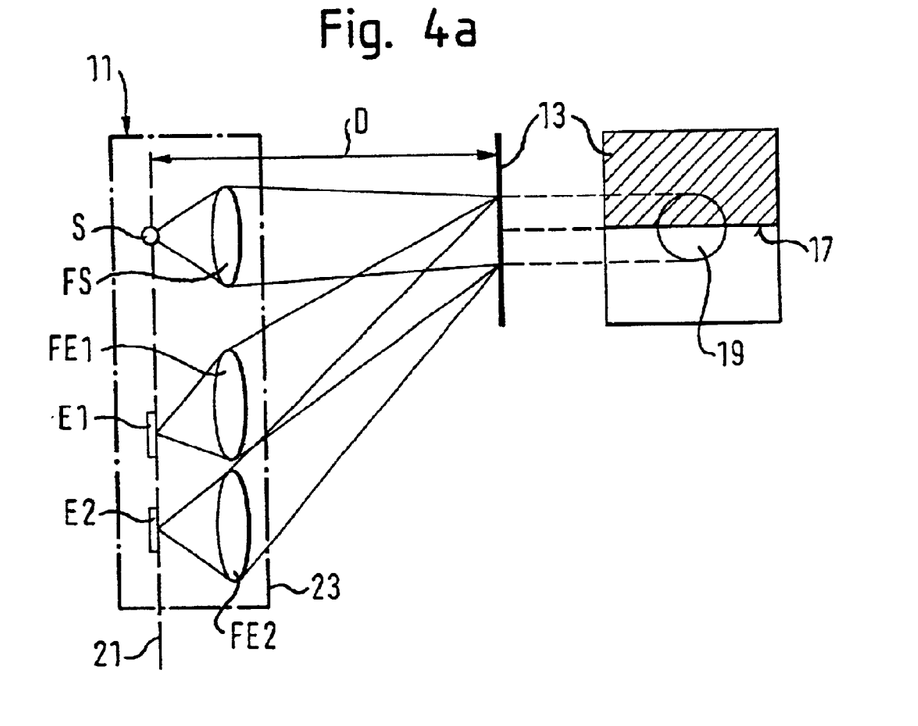
Figure 4B:
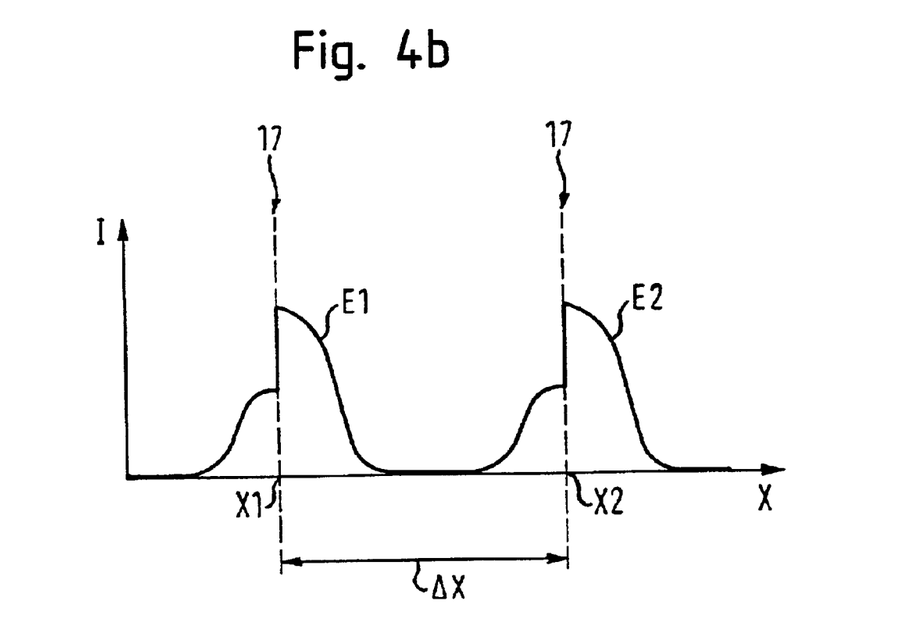

FIGS. 4a and 4b show a further embodiment of the invention which is particularly suitable to eliminate the damage of the interfering influence of so-called contrast edges 17 on the sensed object. Contrast edges can, for example, be transitions between dark and light surfaces in lettering on the sensed object 13. In the schematic representation of FIG. 4a, a region with low reflection and/or remittance capability is shown in hatched form. The sensing spot 19 emitted by the sensor 11 simultaneously covers a region with high reflection and/or remittance capability and a region with low reflection/remittance capability.

The effect of the contrast edge 17 at the reception side is shown in FIG. 4b indicating the received signals at the two reception units E1, E2. The received signal is lower in the region corresponding to the sensed object surface with low reflection and/or remittance capability.

If only one reception unit and thus only one received signal were present, then adulteration would occur in the formation of the center of the intensity distribution in order to determine the object X position required for the determination of the object distance D, since this X position would be shifted in the direction of the region having a high reflection and/or remittance capability.

The additional channel is provided in accordance with the invention by means of a further reception unit E2 and delivers an additional received signal in which the contrast edge 17 also has an effect. Thus two received signal are present which each have a characteristic region deriving from the contrast edge 17 in which the intensity changes abruptly or stepwise.

In the evaluation of the intensity distributions, these characteristic regions can be identified without problem and associated with corresponding positions X1, X2 on the reception units E1, E2. Independently of the specific curve of the intensity distributions of the received signals, the distance ΔX of the positions X1, X2 of the characteristic regions forms a measure for the object distance D to be determined.

What is claimed is:

1. A method for the determination of an object distance between an opto-electronic sensor working according to the principle of triangulation and a sensed object, comprising
    providing the sensor with at least one measuring channel between a transmission unit for emitting first electromagnetic sensing rays into the measuring region and a reception unit for detecting sensing rays coming from the measuring region;
    providing the sensor with at least one additional channel which has at least one of a further transmission unit for transmitting second electromagnetic sensing rays into the measuring region and a further reception unit;
    expanding the second sensing rays and directing the expanded second sensing rays onto the measuring region to form an expanded sensing zone; and
    jointly evaluating the received signals of the measuring channel and of the additional channel in order to determine the object distance by forming a difference between the received signals of the measuring channel and of the additional channel.

2. A method in accordance with claim 1 wherein the measuring channel and the additional channel are operated at least substantially simultaneously for each object distance.

3. A method in accordance with claim 1 wherein the received signals of both the measuring channel and of the additional channel are used to determine a distance value serving as the measure for the object distance.

4. A method in accordance with claim 1 wherein in at least one of the measuring channel and in the additional channel the respective intensity distribution of the received signal on the reception unit is used for determining the distance.

5. A method in accordance with claim 4 wherein one of the position of a center of the intensity distribution and of a characteristic region of the intensity distribution is used in at least one of the measuring channel and the additional channel for determining the distance.

6. A method in accordance with claim 1 wherein jointly evaluating comprises deducting the received signal of the additional channel from the received signal of the measuring channel, setting negative difference values resulting from the deduction at zero, and using positive difference signals resulting from deducting for determining the object distance.

7. A method in accordance with claim 1 including selecting an intensity of the sensing rays such that the received signal is larger in the additional channel than in the measuring channel in a characteristic region which is caused by an interfering object having one of a high reflection and remittance capability in comparison to the sensed object.

8. A method in accordance with claim 1 wherein expanding comprises expanding the second sensing rays in at least one of an unfocused, scattered, expanded and diffused manner.

9. A method according to claim 1 wherein the sensing zone covers at least a substantial part of a half-space of the sensor on the sensed object side.

10. A method for the determination of an object distance between an opto-electronic sensor working according to the principle of triangulation and a sensed object, comprising
providing the sensor with at least one measuring channel between a transmission unit for emitting first electromagnetic sensing rays into the measuring region and a reception unit for detecting sensing rays coming from the measuring region;
providing the sensor with at least one additional channel which has at least one of a further transmission unit for transmitting second electromagnetic sensing rays into the measuring region and a further reception unit for receiving signals;
evaluating the received signals of at least one of the measuring channel and the additional channel to determine a distance value for the object distance;
determining from the signals received by the further reception unit whether the signals fulfill at least one additional criterion; and
using the distance value as the measure of the object distance if the additional criterion is fulfilled.

11. A method in accordance with claim 10 including providing a separate transmission unit for each of the measuring channel and the additional channel.

12. A method in accordance with claim 11 including emitting the sensing rays of the measuring channel and of the additional channel in different directions.

13. A method in accordance with claim 12 wherein, when mutually corresponding characteristic regions of the received signals of the measuring channel and of the additional channel are jointly evaluated, an investigation is being made in each case whether they are mutually displaced by an expected amount.

14. A method in accordance with claim 11 including focusing the sensing rays of the measuring channel and of the additional channel at different distances.

15. A method in accordance with claim 14 wherein, when mutually corresponding regions of the received signals of the measuring channel and of the additional channel are jointly evaluated, an investigation is being made in each case whether the emitted sensing rays are imaged with different degrees of sharpness.

16. A method in accordance with claim 10 including focusing the sensing rays of both the measuring channel and the additional channel.

17. A method in accordance with claim 10 wherein the measuring channel and the additional channel are operated at least substantially simultaneously for each object distance.

18. A method in accordance with claim 10 wherein the received signals of both the measuring channel and of the additional channel are used to determine a distance value serving as the measure for the object distance.

19. A method in accordance with claim 10 wherein in at least one of the measuring channel and in the additional channel the respective intensity distribution of the received signal on the reception unit is used for determining the distance.

20. A method for the determination of an object distance between an opto-electronic sensor working according to the principle of triangulation and a sensed object, comprising
providing the sensor with at least first and second measuring channels and a transmission unit emitting electromagnetic sensing rays into a measuring region, each channel including one of a reception unit and an optical reception system for detecting sensing rays coming from the measuring region; and
arranging the transmission unit between the at least one of the reception unit and the optical reception system, and
jointly evaluating the received signals of the first and second channels to determine the object distance by
respectively determining for the received signals a center of an intensity distribution of the detected sensing rays coming from the measuring region and a distance of the center from a position of the transmission unit, and
using a mean value of the center distances as a measure for the object distance.

21. A method for the determination of an object distance between an opto-electronic sensor working according to the principle of triangulation and a sensed object, comprising
providing the sensor with at least first and second measuring channels and a transmission unit emitting electromagnetic sensing rays into the measuring region, each channel including one of a reception unit and an optical reception system for detecting sensing rays coming from the measuring region;
arranging the at least one of the reception units and the optical reception system at the sane side of the transmission unit; and
jointly evaluating the received signals of the first and second channels to determine the object distance by
respectively determining for the received signals a center of an intensity distribution of the detected sensing rays coming from the measuring region and a distance of the center from a position of the transmission unit, and
using a distance between mutually corresponding characteristic regions of the received signals of the first and second channels as a measure for the object distance.

22. Apparatus for the determination of an object distance between an opto-electronic sensor working according to the principle of triangulation and a sensed object, comprising
at least one measuring channel between a transmission unit for emitting first electromagnetic sensing rays into a measuring region and a reception unit for detecting sensing rays coming from the measuring region;

at least one additional channel which has at least one of a further transmission unit for transmitting second electromagnetic sensing rays into the measuring region and a further reception unit;

a device expanding the second sensing rays and directing the expanded second sensing rays onto the measuring region to form an expanded sensing zone; and a processor which jointly evaluates the received signals of the measuring channel and of the additional channel in order to determine the object distance by forming a difference between the received signals of the measuring channel and of the additional channel.

23. Apparatus for the determination of an object distance between an opto-electronic sensor working according to the principle of triangulation and a sensed object comprising at least one measuring channel between a transmission unit for emitting first electromagnetic sensing rays into the measuring region and a reception unit for detecting sensing rays coming from the measuring region;

at least one additional channel which has at least one of a further transmission unit for transmitting second electromagnetic sensing rays into the measuring region and a further reception unit for receiving signals;

a device evaluating the received signals of at least one of the measuring channel and the additional channel to determine a distance value for the object distance;

a further device determining from the signals received by the further reception unit whether the signals fulfill at least one additional criterion; and a processor for using the distance value as the measure of the object distance if the additional criterion is fulfilled.

* * * * *